Feb. 25, 1936. G. D. GARDNER 2,031,766
CORING KNIFE
Filed Aug. 15, 1933
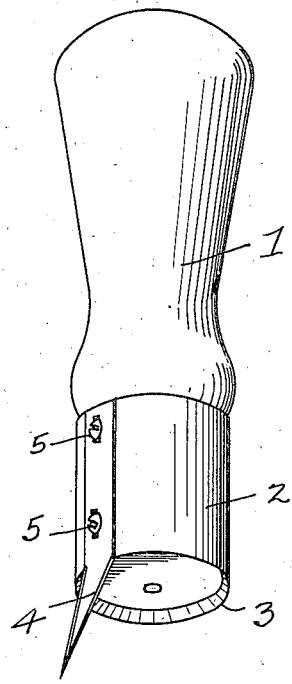
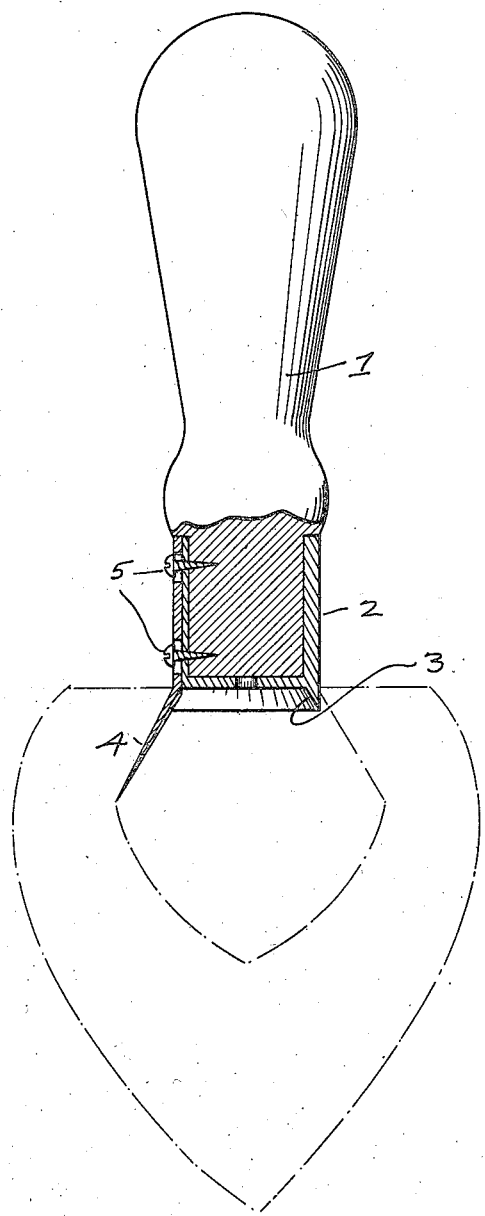
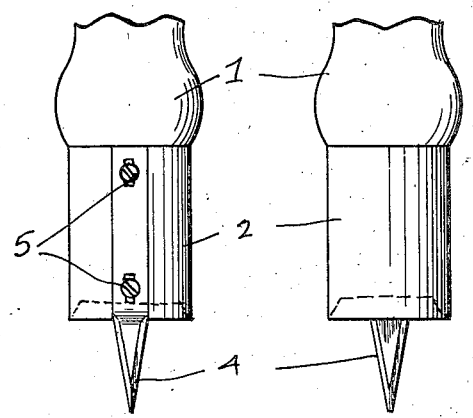
INVENTOR
GEORGE D. GARDNER
BY
Lincoln Johnson
ATTORNEY Patented Feb. 25, 1936

2,031,766

UNITED STATES PATENT OFFICE 2,031,766

CORING KNIFE

George D. Gardner, San Jose, Calif., assignor to Herbert Edward Gray, San Jose, Calif.

Application August 15, 1933, Serial No. 685,277

2 Claims. (Cl. 146—53)

The invention relates particularly to a fruit and vegetable coring knife.

An object of the invention is to provide a coring knife having means thereon to center it on the fruit or vegetable to be cored, to permit thereafter turning movement of the knife relative to the fruit or vegetable.

A further object of the invention is to provide a coring knife, having an adjustable blade therein inclined at an angle to the axis of means on the knife to center the rotation of said blade.

A further object of the invention is to provide a coring knife that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawing:

Fig. 1 represents a perspective view of a coring knife constructed in accordance with my invention.

Fig. 2 is a perspective view of my coring knife mounted in the coring position on an article to be cored.

Fig. 3 is a side elevation of the knife shown in Fig. 2.

Fig. 4 is a cross section through the coring knife taken at right angles to the position shown in Fig. 2.

The coring knife to be hereinafter described is particularly adaptable for hand use, in coring the heart or core from artichokes, although it may be used for coring or pitting other fruits and vegetables.

In detail, the construction illustrated in the drawing comprises the handle 1 having a metal cap 2 on an end thereof. The end edge of the cap 2 is provided with a peripheral bead or shoulder 3 arranged concentrically to the axis of the handle 1. The circumferential bead 3 is tapered to an attenuated edge and projects beyond the plane of the end of the metal cap 2. A cutting blade 4 is adjustably secured by screws 5 to one side of the metal cap 2 whereby the distance that the blade projects beyond the end of the cap 2 may be regulated. The cutting end of the blade 4 is inclined at an angle to the axis of the metal cap 2. The blade 4 is preferably made from stainless metal, because in coring artichokes, any metal other than stainless metal would tend to discolor the artichokes through chemical reaction therewith.

An artichoke to be cored would first have the stem end thereof cut off on a plane extending through the heart and at right angles to the center axis of the said artichoke. The coring knife would then be engaged with the flat end of the artichoke, the circular shoulder 3 in the said knife penetrating into the said artichoke, and approximately aligning the center axis of the knife with the axis of the artichoke. The cutting blade of course, would be entered into the artichoke, at an inclined angle. With the knife in the proper position for coring purposes the operator would either rotate the cutting knife within the artichoke or turn the artichoke relative to the cutting knife, to prescribe a circular cut in the artichoke and thereby sever the heart or core thereof from the relatively unedible outer leaves. After the heart or core has been cut through the agency of my cutting knife, the operator withdraws the knife from the said artichoke and breaks away the outer leaves of the artichoke up to the circular cut and permitting the cored heart or core to be separated or removed. Although I have shown the peripheral bead or shoulder 3 as centering the cutting blade during its coring movement in the artichoke, I do not wish to be limited exclusively thereto, as it would be clearly within the purview of the invention to substitute some other centering means in combination with the particular coring knife shown.

Having thus described this invention, what I claim and desire to secure by Letters Patent is:

1. A coring knife comprised of a handle having a blade projected from a closed end thereof at an angle outwardly to the axis of said handle; and an annular shoulder on an end of the handle concentric with the axis thereof and adjacent the root end of the blade to penetrate into the article to be cored to center the knife as it is rotated.

2. A coring knife comprised of a handle having a blade projected from a closed end thereof at an angle outwardly to the axis of said handle; means to adjust the length of projection of the knife beyond the end of the handle; and an annular shoulder on an end of the handle adjacent the root end of the blade and in alignment with the blade and concentric with the axis of the handle to penetrate into the article to be cored to center the knife as it is rotated.

GEORGE D. GARDNER.